United States Patent [19]

Dorman

[11] 3,999,054
[45] Dec. 21, 1976

[54] LUMINAIRE AND OPTICAL SYSTEM FOR USE THEREIN

[75] Inventor: William H. Dorman, Corning, N.Y.

[73] Assignee: Corning Glass Works, Corning, N.Y.

[22] Filed: Aug. 4, 1975

[21] Appl. No.: 601,262

[52] U.S. Cl. .............................. 240/1.2; 240/106 R; 340/25
[51] Int. Cl.² ...................... B64F 1/20; G08G 5/00
[58] Field of Search .............. 240/1.2, 106; 340/25; 350/286, 204

[56] References Cited
UNITED STATES PATENTS

| | | | |
|---|---|---|---|
| 2,184,004 | 12/1939 | Pennow | 240/1.2 |
| 2,352,801 | 7/1944 | Rolph | 240/1.2 |
| 3,007,034 | 10/1961 | Reed et al. | 240/1.2 |
| 3,250,907 | 5/1966 | Keck et al. | 240/1.2 |
| 3,327,104 | 6/1967 | Loch | 240/1.2 |
| 3,369,112 | 2/1968 | Loch | 240/1.2 |
| 3,369,113 | 2/1968 | Loch | 240/1.2 |
| 3,463,913 | 8/1969 | Shavalier | 240/1.2 |
| 3,535,504 | 10/1970 | Beal et al. | 240/1.2 |
| 3,624,379 | 11/1971 | Bliss et al. | 240/1.2 |

*Primary Examiner*—Richard A. Wintercorn
*Attorney, Agent, or Firm*—Burton R. Turner; Clarence R. Patty, Jr.

[57] ABSTRACT

A luminaire for providing at least a shallow uniform equatorial zone of illumination above the pavement of airport taxiways and parking areas comprising a housing provided with an upper section having a vertical opening therethrough, a lens within the opening having a shallow frustoconical light exit face extending only slightly above the opening and a steeper generally conical light entrance face coaxial with and disposed below the light-entrance face, a lamp recessed substantially below the entrance face and proximate the axis of the light exit and entrance faces, and a reflector symmetrical about the axis of the exit and entrance faces for reflecting light rays from the lamp into the light entrance face at a predetermined range of angles of incidence therewith.

9 Claims, 2 Drawing Figures

LUMINAIRE AND OPTICAL SYSTEM FOR USE THEREIN

BACKGROUND OF THE INVENTION

This invention relates generally to lighting units, and more particularly to luminaires adapted to be mounted in a paved horizontal surface such as an airport taxiway.

Currently airport taxiway lights or markers are installed along the center lines of taxiways and at parking areas or aprons to guide pilots from runaway turn-offs to positions within parking areas near terminal buildings, and also to provide guidance to ground crew personnel. The lights are embedded as close as possible to flushness with the pavement of the taxiway so as to permit grading of snow with minimal damage to the light and to permit aircraft and ground crew vehicles to pass directly over the light. The guidance function of the light is carried out by customary taxiway lights by a main prismatic lens which concentrates light in a limited vertically narrow equatorial zone extending circumferentially around the light source at a slight angle to the horizontal plane of the runway surface. It is important that the lower extent of the zone be as shallow as possible, such as 5° above horizontal, to provide guidance to ground crew personnel, such as air marshalls, who direct aircraft into specific positions within parking areas. Usually, the zone extends through a band width of about 10° to approximately 15° above the horizontal.

Known conventional taxiway lighting units employ a housing having upper and lower sections removably joined together by a fluid-tight seal, the upper housing section having a central vertical opening, and an optical system secured within the opening. The optical system includes a main lens, mounted within the opening, having a light exit face of a truncated conical or cylindrical form and a light entrance face of a stepped or prismatic form, and a lamp disposed relative to the main lens to provide illumination of the aforementioned shallow equatorial zone primarily by refraction of light rays emmitted directly from the lamp against the light entrance surface of the lens. Reflectors of a spherical or parabaloid shape are disposed generally about the filament of the lamp to direct additional light rays diverging from the filament upwardly against the lens.

The upper housing section of such conventional taxiway or runway markers is provided with a plurality of relatively high radially-disposed upstanding fin or rib members which serve to protect the lens, that is, which permit aircraft and vehicle wheels and snow-plow blades to pass over the unit without damage to the lens. The upstanding ribs of known markers extend radially outwardly from positions proximate the outer circumference of the lens. The top of the lens is sometimes protected by a metal top cover secured to the fins by a plurality of bolts. Gaskets are disposed between the upper end of the lens and the top cover plate and between the lower end of the lens and the housing upper section. The upper surface of the top plate of known units extends usually ¾ to 1 inch above the horizontal plane through the surrounding pavement surface, and thus provides substantial obstruction to vehicular wheels and to snow-plow blades.

In another type of conventional taxiway light, the radially disposed ribs extend over the top of the lens and join at a central position above the lens, and are strengthened by additional rib members connecting between the ribs at circumferential positions lying generally overhead the outer circumference of the lens. The rib structure of this latter type of light is integrally molded with the upper housing section and has an overall height of approximately 1 inch above the surrounding pavement surface.

The first-mentioned type of marker which employs a top plate above the lens is adapted to produce illumination only in the shallow equatorial zone. It does not provide illumination directly overhead the lens due to the blockage of light by the top plate. In contrast, the latter-mentioned type produces overhead illumination, in addition to the low angle equatorial illumination. The overhead light is beneficial in apron or parking areas because it illuminates the undersides of aircraft above the marker and thus gives ground crew personnel, such as air marshalls, a reference or fixation with which such personnel can guide the aircraft into an exact position in the parking area. However, the radial and circumferential network of ribbing above the latter marker blocks a substantial portion of the light which would otherwise be projected into the overhead zone.

Furthermore, the relatively high, radially disposed upstanding ribs or fins of all known conventional taxiway marker lights block or shadow a substantial portion of the low angle illumination provided by the optical system therein. Specifically, the fins are of substantial thickness and height (usually in excess of ¾ to 1 inch) at positions adjacent the lens, with the fins sloping radially downwardly to form a straight inclined upper edge. Light proceeding from the lens in a radial direction is shadowed by the thickness of the fins and in an off-radial or skewed direction by the sides of the upstanding fins. The light distribution pattern of the conventional marker is thus not homogeneous or uniform about the optical system of the unit, but rather varies circumferentially according to the shadowing caused by the protective upstanding fins.

The rib structures and/or cover plate assembly of the conventional markers provide many sharp and deep corners or crevices in which dirt and other contaminates may accumulate and from which such dirt is difficult to remove or clean. Specifically, dirt accumulates at the juncture of the fins and the light exit face of the lens and thereby reduces or diffuses the illumination provided by the lens.

The present invention provides a taxiway marker or light which overcomes the aforementioned problems.

SUMMARY OF THE INVENTION

The luminaire of the present invention includes a housing having upper and lower sections, with the upper section having a generally flat upper surface portion provided with a vertical opening therethrough. A lens is secured within said opening and includes: a shallow upwardly and inwardly tapering truncated conical light exit surface, the axis of which is disposed vertically within the housing opening; a central light exit surface having a circular edge defining the upper extent of the conical exit surface; a truncated conical light entrance surface which is coaxial with the conical exit surface; and a preferably concave central light entrance surface projecting inwardly from an upper end of the conical entrance surface. A lamp is recessed in the housing substantially below the lens proximate the axis of the conical lens surfaces. A reflector is secured in the housing below the lens and about the lamp. The reflector includes a first specular surface, positioned above the filament of the lamp, in the form of a portion of a curved surface of revolution having an axis of revolution approximately coincident with the axis of the lens conical exit and entrance surfaces; the first specular surface is contoured to redirect light rays diverging from the light source unto the conical entrance surface at angles suitable for refraction by the lens into a zone slightly above a horizontal plane through the upper surface portion of the housing. A second specular surface may be provided below the first specular surface to collect light emitted downwardly relative to the first specular section and reflect the collected light upwardly against the first specular surface for reflection into the conical entrance surface, thus augmenting the light which is reflected only once and thereafter refracted into the shallow equatorial zone.

The housing is embedded in pavement to the extent that the upper flat surface portion of the housing is approximately flush with the surface level of the pavement; and due to the shallow contour of the light-exit surfaces, the lens of the optical system of the present invention may project only 1/18th of an inch above the pavement level. In order to obtain distribution of light into a very shallow equatorial zone from the extremely shallow conical light-exit face, the conical light-entrance face surface has a slope which is substantially more steep than that of the conical exit surface and the reflector directs light rays from the lamp at a predetermined range of angles of incidence with the conical entrance face. Preferably, the first specular surface of the reflector has a contour adapted to reflect rays against upper portions of the conical entrance surface at smaller angles of incidence with such entrance surface portions than the angles of incidence of reflected rays impinging lower portions of the conical entrance face; such a contour will cause the lower portion of the equatorial zone to be formed by rays emitted from the upper extremities of the lens.

The luminaire of the present invention also provides uniform illumination of a zone lying generally overhead the system. This is accomplished, first, by the provision of external and internal surface portions of the lens respectively with the central light exit surface and the preferably concave entrance surface and, second, by the substantially recessed position of the lap which causes the rays emitted directly against the conical surface of the light entrance face to be refracted into a zone lying above the equatorial zone but generally below the zone of rays transmitted from the central light exit surface. The overhead distribution pattern of the present optical system is particularly useful for guidance to ground crew personnel, such as air marshalls, whose responsibility includes the direction of aircraft into exact positions in parking areas near terminal buildings. The overhead portion of the light distribution zone of illumination will be reflected from lower portions of approaching aircraft, which reflections gives the marshall a fixation of the position of the plane relative to the embedded marker light sources.

Also, the present invention provides a luminaire which does not require the number of structural elements required of the prior systems. The lens of the present lighting device is simply rigidly secured within a vertical opening in a flat upper surface portion of the housing to the extent that the light exit face extends only slightly through the opening and above the flat housing surface. Due to the relatively steep taper of the conical light entrance surface and the concave contour of the central light entrance surface, the lens has an arched geometry and edge thickness which gives sufficient strength to the lens to withstand the forces applied by over-passing aircraft and vehicles. Such construction eliminates the need for a cover or top plate positioned above the lens, a gasket between the cover plate and upper surface of the lens, and for bolts to secure the plate to the housing against the gasket. Also, the present luminaire provides an overhead light distribution without the provision of an integrally molded rib structure extending over the upper surface of the lens. Such a construction thus eliminates the shadowing caused by the overhead and high radial rib structure and the dirt accumulation associated with the protective ribs.

BRIEF DESCRIPTION OF THE DRAWINGS

The construction of one embodiment of a taxiway marker may be best considered with reference to the accompanying drawings, wherein.

DETAILED DESCRIPTION

Figure 1:
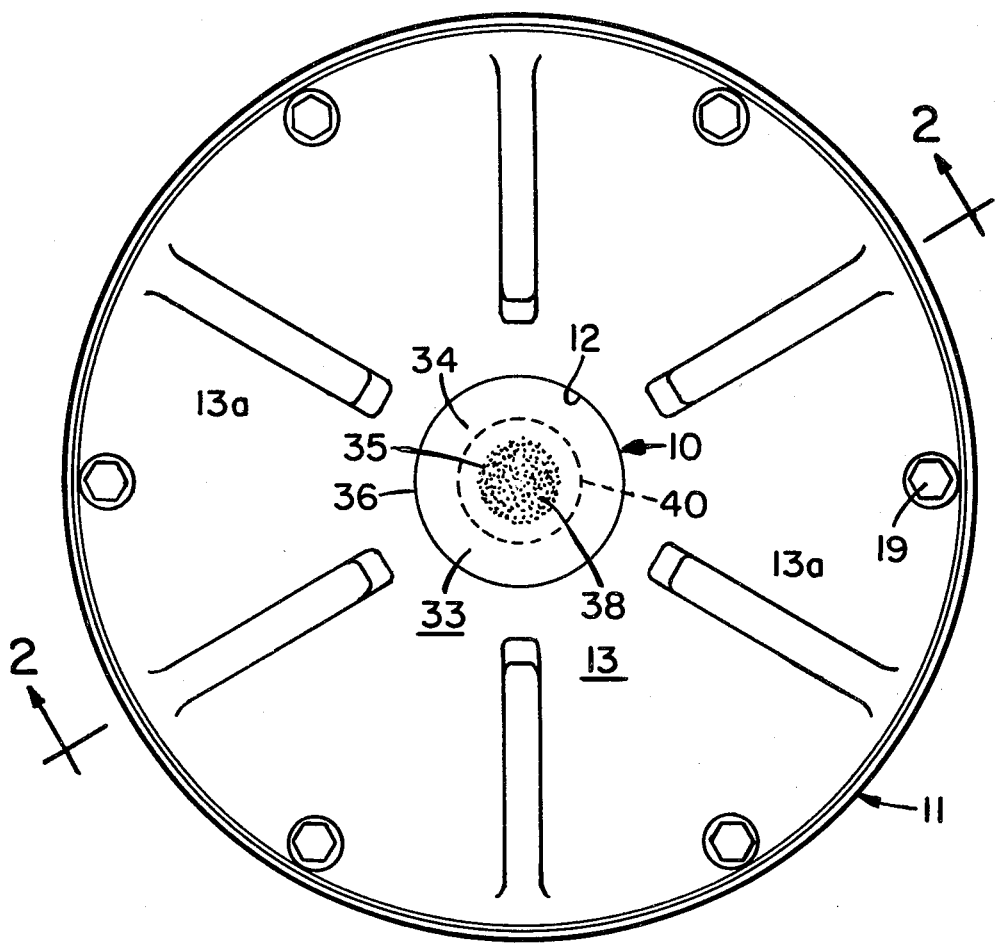
FIG. 1 is a top plan view of the taxiway light of the present invention.
Figure 2:
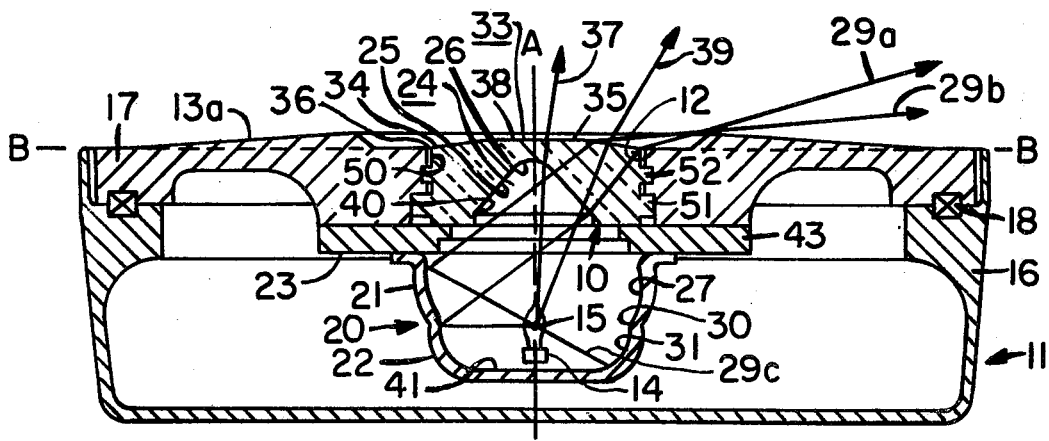
FIG. 2 is a view taken through line 2—2 of FIG. 1.

Referring now to FIGS. 1 and 2, there is shown a refracting lens 10 mounted within a housing 11 which has a vertical opening 12 in an upper surface 13 thereof to receive the lens. The housing preferably includes a shallow cylindrical lower section 16, which is embedded within the pavement of an airport taxiway or parking area to the extent that the uppermost peripheral surface of the lower section is approximately flush with or slightly below the plane of the pavement, and an upper section 17 secured by a fluid-tight seal to the lower section 16. Such fluid-tight seal may be provided by an annular gasket 18 interposed between the lower and upper sections, with suitable fasteners, such as bolts 19, being used to force the upper and lower sections together tightly against the annular gasket 18.

The opening 12 has a vertical center line A—A and is formed generally in the center of upper section 17, with the portion of upper surface 13 immediately surrounding opening 12 being generally flat. The upper surface 13 may be provided with radially disposed shallow ribbing members 13a which have inner ends spaced well apart from opening 12. The housing is embedded in pavement to the extent that the flat portion of upper surface 13 is approximately aligned with a horizontal plane through the surface level B—B of the pavement.

A light source or lamp 14 having a filament 15 is secured by suitable means (not shown) below the lens 10 relatively deeply within housing 11, i.e., at a position substantially recessed from lens 10. Lamp 14 is mounted relative to center-line A—A such that the filament 15 is proximate to or inersects the center-line. A reflector 20 is disposed about the light source 14 and includes an upper section 21 being positioned below the lens 10 and having a lower circular edge 30 lying in a plane which intersects the filament 15 of light source 14, and a lower section 22 projecting downwardly from lower edge 30 of upper section 21. Upper and lower sections 21 and 22 have inner specular surfaces 27 and 31, respectively, which are symmetric about the center-line A—A. The reflector may be fastened to a lower surface 23 of a retainer 43 connected to the housing upper section 17.

The operation of the optical system of the present light source is illustrated in FIG. 2. The lens 10 has an internal surface portion having a light entrance face 24 disposed downwardly toward the light source 14. The entrance face 24 includes a first surface 25 which has a predetermined contour which approximates a portion of a cone having a predetermined slope or taper about an axis, which axis intersects filament 15 and projects vertically from the filament 15 generally coaxially with the center-line A—A of housing opening 12. First light-entrance surface 25 has a lower circular edge 40 lying in a plane normal to centerline A—A. A second central light entrance surface 26, preferably of a partially spherical or other concave form, adjoins surface 25 at an upper circular extent of the first entrance face 25. When central section 26 is in the form of a portion of a sphere, the center of such sphere lies on the center-line A—A of the cone forming first section 25. Insofar as the lens will be subjected to axial compression induced by aircraft or vehicular wheels, the curvature of second surface 26 gives the lens a rounded arch construction adapted to withstand such compression without rupture or fracture. The lower edge 40 of light-entrance face 24 is separated from light source 14 by a distance at least as great as the vertical height or reflector section 21.

The reflector 20 is adapted to direct light rays emitted from the light source 14 into the conical first surface 25 of the light-entrance face 24 at a predetermined range of incident angles therewith. The specular inner surface 27 of upper section 21 has a predetermined contour which approximates a portion of the surface of a curved solid of revolution formed by revolving an open curved line about an axis which intersects the curved line at the end points thereof, which axis of revolution is approximately coincident with the axis of the first light entrance surface 25, and thus also with center-line A—A. The curved line may be an arc of a circle, parabola, or ellipse, or a combination of such forms. Light rays diverging outwardly and upwardly from the light source 14 strike the specular surface 27 of upper section 21 and are reflected inwardly and upwardly toward the conical first surface 25 of light entrance face 24. Light rays, such as ray 29a, impinging at the lowermost edge 30 of surface 27, which edge 30 preferably lies in a plane normal to the center-line A—A, are preferably directed from near edge 30 against the lower end of conical lens entrance surface 25, while rays, such as 29b, impinging against an upper extremity of specular surface 27 are reflected preferably against the upper end of conical surface 25. Assuming light source 14 to act as a point light source, it will follow that the rays reflected from specular surface 27 will form a zone of reflected rays which will intersect center-line A—A and form a predetermined range of angles with the center-line.

The specular inner surface 31 of reflector lower portion 22 has a contour which approximates a portion of a sphere having a center lying on the center line A—A proximate filament 15 and has a radius which preferably contacts the lower edge 30 of specular surface 27. The lower reflector section 22 is designed to direct diverging light rays, such as indicated by ray 29c, which are emitted from lamp 14 below the horizontal plane of edge 30, upwardly against the upper section 21 of the reflector 20 at angles of incidence relative to the curved specular surface 27 thereof such that the rays will be redirected from the specular surface 27 against the conical surface 25 of the light entrance lens face 24 at a predetermined range of angles of incidence therewith, which range of angles of such twice-reflected rays is approximately equal to the range of angles of incidence formed by the rays which are directly reflected from upper section specular surface 27. That is, lower section specular surface 31 is contoured to direct light from source 14 against upper surface 27 to cause reflection from the upper surface into a zone of twice-reflected rays which generally intersects center-line A—A and is contiguous with at least a portion of the zone of once-reflected rays.

The lower spherical section 22 preferably extends downwardly into housing 11 a predetermined vertical distance below filament 15 such that rays, such as ray 29c, are reflected from just above lower-most portions thereof against the upper extremity of reflector upper surface 27. It is noted that ray 29c is shown as being coincident with ray 29b after reflection from specular surface 27; this, of course, also assumes a hypothetical point light source, rather than a lamp which would refract or block the ray 29c from its illustrated reflected path. It will be appreciated by those skilled in the art that lower section 22 may be extended downwardly and inwardly to provide additional specular surface of a spherical shape for reflecting light directly into both light entrance face surfaces 25 and 26, rather than specular surface 27 alone. However, the embodiment of the lower reflector section shown in FIG. 2 has a flat bottom with a specular inner surface 41 for reflecting light directly into lens 10.

The light rays once-reflected from the reflector upper section 21, such as rays 29a and 29b, and at least a portion of the rays twice-reflected sequentially from the lower and upper reflector sections 22 and 21, such as ray 29c, strike the conical entrance surface 25, are refracted upwardly toward the zenith on center-line A—A, (i.e. away from horizontal), proceed through lens 10 in diverging relation, therafter striking a light exit face 33, and are refracted downwardly out of the lens into rays which all together from a relatively narrow equatorial zone with extends upwardly from a slight or very low angle, such as 5°, from the horizontal to a greater angle, such as 15°, from the horizontal and which is circumferentially uniform or symmetric about centerline A—A.

The refraction into such an equatorial zone is accomplished in part by providing an external surface portion of lens 10 with a shallow, light exit face 33 defined by a first generally frustoconical annular surface 34 and a second central surface 38 inwardly of and bounded by said first annular surface 34. The first surface 34 has a predetermined contour which approximates a portion of the surface of a cone, having an axis coaxial with center-line A—A (the axis of conical section 25 of entrance face 24). The conical exit surface 34 is defined at its upper end by a circular edge 35 lying in a plane normal to center-line A—A and at its lower end by a larger diameter circular lower or outer edge 36 also lying in a plane normal to centerline A—A. Second surface 38, is preferably flat and adjoins first surface 34 at edge 35.

The first surface 34 slopes downwardly and outwardly to form a slight acute angle with an inwardly projected horizontal plane through lower edge 36, or, conversely, a very large obtuse angle with the surrounding flat upper surface 13 of housing 11. The shallow slope of exit face 33 permits the lens to be mounted with the lower edge 36 generally flush or even with the surface level of the surrounding pavement, and with the upper edge 35 only slightly elevated above the pavement, for example, merely ⅛ of an inch or less when lower edge 36 is 3 in. in diameter and the aforementioned acute angle is 10°.

To obtain refraction into a vertical or equatorial zone extending only slightly above horizontal and also to provide lens 10 with a thickness and geometry which is capable of withstanding the forces to be exerted by aircraft and vehicles passing over the lens, the conical surface 25 of lightentrance face 24 has a lower circular edge 40 substantially smaller in diameter than the lower edge 36 of exit face 33, and is angularly displaced to form a greater angle with the horizontal than the conical exit surface 34. The exact slope of conical entrance surface 25 needed to refract light into an equatorial zone only slightly above horizontal is, however, dependent on the range of angles of incidence of the rays, such as 29a and 29bl, which are reflected from specular surface 27, the index of refraction of the material of lens 10, and the slope of conical exit face 34. In one example, when exit face 34 formed an angle of 10° with horizontal and the index of refraction of the lens was 1.474 (Corning Glass Works Code 7740 borosilicate glass), the entrance surface 25 formed an angle of 40° with a horizontal plane projecting inwardly through lower edge 40.

It will be appreciated that it is advantageous to have the relatively shallow rays which form a lower portion of the equatorial zone be transmitted from the upper rather than the lower end of exit surface 34 because there will be less shadowing of such rays by upper surface portions of housing. In the example of the exit face 33 mentioned above wherein the upper edge 35 is merely ⅛ inch above the lens lower edge 36, it is particularly advantageous to generate the low-lying or shallow rays of the equatorial zone of light from near upper edge 36.

Accordingly, the specular surface 27 of the reflector upper section 21 preferably has a contour which approximates a curvilinear surface which is formed by revolving an arc of a circle about an axis of revolution, the axis of revolution being coaxial with the axis of the conical entrance surface 25 and thus also centerline A—A. The light source 14 is positioned at the intersection of the axis of revolution and a plane through a lower circular edge 30 of the specular surface 27. Light rays diverging from the light source diverge therefrom and are reflected from surface 27 into a zone of diverging reflected rays which form a predetermined range of angles of incidence with conical light entrance surface 25. Specifically, light rays directed from an upper extent of the curvilinear specular surface 27, such as represented by ray 29b, form relatively smaller angles of incidence with entrance surface 25 than the angles of incidence formed by the rays directed from near the lower edge 30 of specular surface 27 against the lower extent entrance surface 25, such as indicated by ay 29a. Due to the common prism angles of conical entrance and exit surfaces 25 and 34, the rays, such as ray 29b, emerging from the upper extent of the conical exit surface 34 are refracted by lens 10 to form a smaller or lower angle above the horizontal than the rays, such as ray 29a, emerging from the lower extent of the exit surface 34.

In addition to providing a relatively narrow and shallow equatorial zone of light, the optical system of the present light source also provides an uninterrupted, uniform zone of light projecting directly above or overhead the lens 10. A portion of the light rays, such as ray 37, emanating from light source 14 and also those reflected (if at all) from the bottom 41 of the reflector portion strike the preferably concave central entrance surface 26, are refracted or spread outwardly at varying angles away from centerline A—A, proceed through lens 10 in a divergent manner, and thereafter strike the second central surface 38 of light exit face 33. Central exit surface 38 is preferably flat in order to minimize the height of exit face 33 and also is preferably stippled, frosted, fluted or otherwise roughened to diffuse the light rays 37 emerging therefrom, and thus to reduce the glare of such light. Further light rays, such as ray 39, diverging from recessed lamp 14, are projected directly into conical entrance surface 25, are refracted outwardly away from the vertical, proceed in a nonparallel manner through lens 10, and are thereafter refracted further outwardly into a second zone lying generally between the shallow equatorial zone formed by once- and twice-reflected and refracted rays, such as rays 29a, 29b, 29c, and the diffused generally overhead zone formed by light-rays, such as ray 37, transmitted through central exit surface 38.

In the preferred embodiment shown in FIG. 2, lens 10 has circumferential face portions provided with a cylindrical upper section 50 of a diameter slightly less than the inner diameter of opening 12 and a lower larger diameter rim section 51, also of cylindrical form, adapted to be engaged within an enlarged complemental stepped section of opening 12. A fluid-tight seal is obtained between lens 10 and housing opening 12 by a gasket 52 within a complemental annular groove formed in a side-wall portion of opening 12. A retaining element 43, having a central opening to permit the light from the refractor 20 to pass therethrough, is secured to the underside of housing section 17 and abuts against the periphery of the lower surface of lens 10; and when element 43 is properly in place, lens 10 is rigidly held in a horizontal position which transverses opening 12 and at a vertical height such that the lower edge 36 of light exit conical surface 34 is approximately aligned with or slightly below the upper edge of opening 12. The shallow conical surface 34 of lens 10 thus forms a very large obtuse angle with flat upper surface 13 surrounding opening 12, thereby substantially reducing the possibility of accumulation of dirt at the juncture between the lens exit face and the housing. Element 43 is connected to housing upper section 17 by suitable fasteners, such as bolts (not shown); and reflector 20 is connected to the lower surface 23 of retaining element 43.

It should be noted that the lens 10 is capable of withstanding, without fracture or rupture, considerable forces applied more or less downwardly against light exit face 33 by the wheels of aircraft and vehicles passing directly over the light source. The lens 10 thus does not need ribbing means, associated with conventional runway markers, to absorb the such forces. Rather the lens is preferably made from a glass good strength properties, such as borosilicate glass (e.g., Corning Glass Works Code 7740 glass) and is shaped to make the lens very rigid and relatively thick in a vertical direction, that is, a direction parallel to centerline A—A. As shown in FIG. 2, the smaller diameter of the lower edge 40 of the light entrance face 24 relative to the outer and lower edge 36 of the light exit face 33 provides the lens with an edge portion which is thick in both a longitudinal and radial direction. Furthermore, the relatively steep slope or taper of light entrance surface 25 in combination with the concave contour of central entrance surface 26 provides a steep-rounded or arched entrance face which gives the lens sufficient strength to absorb forces applied downwardly against the glass forming such rounded arch.

It is readily apparent to those skilled in the art that the luminaire of the present invention offers the following advantages: circumferentially uniform, or uninterupted illumination of an equatorial zone which extends upwardly from a very low angle above a horizontal plane through the light exit face of the lens of the light source; uniform or uninterupted illumination of a second zone lying overhead the light source; a light exit face having an extremely shallow profile in a vertical direction which permits the light source to be mounted in pavement such that the lens only extends slightly above a horizontal plane through the surface of the pavement; the provision of an optical system having a strong lens capable of withstanding forces applied against it by aircraft and vehicular wheels; and, due to the low profile and the strength of the lens, elimination of ribbing means for protecting the lens, thereby making the light source easier to manufacture, eliminating the shadowing by the ribs of much of the light directed through the lens, and also eliminating corners and crevices wherein dirt may accumulate against the lens and hence reduce the desired output of the lens.

It will be readily seen that the advantages of the present invention will accrue even though variations are made in the exact configuration of the refracting lens 10 and the reflector 20. A cylindrical housing or mounting unit has been chosen because of the ease with which circular holes may be formed in pavement. It is apparent that no arbitrary dimensions may be given to lens 10 or reflector 20 and that various combinations of shapes of lens lightentrance, lens light-exit, and reflector surfaces within the spirit of the present invention will produce the desired pattern of emergent light.

The range of elevation of the shallow equatorial zone of light in the embodiment illustrated in FIG. 2 has been chosen to be between 5° and 15° above horizontal since present conditions of airport taxiway usage indicate this range to be optimum. Under changed conditions or when used for applications other than taxiway illumination, this range may be varied by changes in the configuration of lens 10 and reflector 20 within the spirit of the invention. For example, it may be desired to employ the luminaire or optical system of the present invention to illuminate or mark highways and, more specifically, highway intersections. For such use, it may be desired to modify the lens and reflectors to provide for a lower or higher equatorial zone of light.

Accordingly, it is intended that the present invention be limited only by the scope of the appended claims.

I claim:

1. An optical system adapted to be embedded in pavement for providing illumination of at least a vertically limited equatorial zone extending from a low angle of elevation above a horizontal plane through the surface of the pavement, said optical system comprising:

a lamp having a filament intersecting a vertial line, said lamp being operable to produce diverging light rays;

first reflector means symmetrical about said vertical line and having a lower edge lying in a plane intersecting said filament for directing a portion of the light rays diverging from said lamp upwardly and inwardly into a zone of once-reflected rays forming a predetermined range of angles with said vertical line;

second reflector means symmetrical about said vertical line and having an upper edge communicating with the lower edge of said first reflector means for directing another portion of the light rays diverging from said lamp upwardly against said first reflector means to form a zone of twice-reflected rays which augments at least a portion of said zone of once-reflected rays; and refractor means disposed above said first reflector means about said vertical line for redirecting light rays within portions of said zones of once-reflected and twice-reflected rays into an equatorial zone of refracted rays which is generally circumferentially uniform about said vertical line, said refractor means including a light entrance face provided with a surface portion having a generally conical contour which is coaxial with said vertical line to form a predetermined range of angles of incidence with at least some of the rays forming said zones of once-reflected and twice-reflected light rays thereby refract said reflected rays at a predetermined range of angles with said vertical line, and a light exit face provided with an annular surface portion having an upwardly and inwardly sloping conical contour which is coaxial with said conical light entrance surface to thereby downwardly refract the light rays reflected into and refracted by said light entrance face into said equatorial zone.

2. The optical system of claim 1 wherein said first reflector means including a specular surface which is formed by revolving an arc of a circle about said vertical line, whereby rays from the lamp directed from an upper portion of the specular surface against an upper extent of the conical light entrance surface portion form smaller angles of incidence therewith, relative to the angles of incidence formed by rays directed from the specular suface against lower portions of the conical light entrance surface portion.

3. The optical system of claim 1 wherein said second reflector means includes a specular surface having a contour which approximates a portion of a sphere having a center proximate said filament of said light source.

4. The optical system of claim 1 wherein said refractor means light entrance face is provided with a second central surface portion of a predetermined concave contour projecting inwardly and upwardly from an upper extent of said annular entrance surface portion; and said refractor means light exit face is provided with a second central surface portion extending inwardly from an upper extent of said conical exit surface portion, said central exit surface portion being generally flat and lying in a plane normal to said vertical line.

5. A luminaire applicable for use in illuminating and marking airport taxiways and the like, said luminaire comprising:

a housing including an upper section provided with a vertically disposed opening therethrough, said housing being embedded in a horizontal surface;

a light transmitting lens having a predetermined index of refraction, said lens secured transversely across said opening;

an interiorly disposed light entrance face formed on a surface portion of said lens which extends inwardly into said housing opening, said light entrance face including a surface of predetermined contour which approximates a portion of the surface of a cone which is formed about an axis, the axis being generally vertically disposed;

a lamp secured within said housing below said lens proximate the axis of the cone which forms said light entrance surface, said lamp operable to produce diverging light rays;

first reflector means secured within said housing about said lamp and lying between said light entrance face and said lamp for directing a portion of said light rays into said light entrance surface, said reflector means including a specular surface of predetermined contour which approximates a portion of a curved surface of revolution formed about an axis, said axis about which said specular surface is formed being proximate said axis of the cone which forms said light entrance surface, said specular surface having a lower circular edge lying in a plane which intersects said lamp;

second reflector means, secured within said housing below said first reflector means for directing another portion of said diverging light rays upwardly against said first reflector means, said second reflector means including a specular surface of predetermined contour which approximates a portion of a sphere having a center which is proximate said lamp;

an exteriorly disposed light exit face formed on a surface portion of said lens which extends outwardly from said housing opening, said light face including a surface of predetermined contour which approximates a portion of the surface of a cone which is formed about an axis, the axis which forms said cone being proximate the axis of the cone which forms said light entrance surface, said light exit surface having a lower circular edge approximately flush with the upper extent of said housing opening; and the predetermined contour of the first specular surface of said first reflector means causing light rays reflected therefrom to strike said light entrance surface at a predetermined range of angles with respect to said light entrance surface, and the predetermined contours of said lens lightentrance and light exit surfaces and the predetermined index of refraction of said lens causing the light rays striking said light entrance face and passing through the lens to be refracted radially outwardly from said light exit surface into an equatorial zone of light which is symmetrical about the axis of said light exit surface.

6. The light source of claim 5 wherein said light entrance face includes a second surface projecting upwardly and inwardly from said surface of said light entrance having the contour which approximates a portion of the surface of a cone, said second entrance surface being concave in shape.

7. The light source of claim 5 wherein said light exit face includes a second surface projecting inwardly from an upper end of said surface of said light entrance surface having the contour which approximates a portions of the surface of a cone, said second exit surface being generally flat and forming a circular edge with said other light exit surface.

8. The light source of claim 7 wherein said second light exit surface is approximately ⅛th inch above the upper extent of said housing opening.

9. A luminaire for airport taxiways and the like comprising, a housing adapted to be recessed within a taxiway, said housing having an open portion extending vertically through an upper portion thereof, a lens securely mounted within said open portion, said lens having an inner surface substantially in the shape of a portion of a cone formed about a central vertical axis, said cone-shaped surface terminating at its upper extent in a concave surface portion, said lens having an outer surface including a frustoconical surface portion about said central axis terminating at its upper extent in a planar surface portion normal to said central axis, a light source proximate said central axis positioned below said lens, a first specular surface in the shape of a curvilinear surface of revolution about said central axis, positioned below said lens, and terminating at its lower extent at a plane passing through said light source normal to said central axis for reflecting light rays emitted from said light source above said last mentioned plane to the inner conical surface of said lens so that through refraction by said lens said light rays from a shallow uniform equatorial zone of lumination immediately above said housing, and a second specular surface substantially of spherical shape communicating at its upper extent with the lower extent of said first specular surface for reflecting rays emitted from said light source below said last mentioned plane toward said first specular surface for reflection toward said conical surface in the same manner as those rays emitted above said last mentioned plane to increase the lumination within said shallow uniform equatorial zone.

* * * * *

UNITED STATES PATENT OFFICE
CERTIFICATE OF CORRECTION

PATENT NO. : 3,999,054
DATED : December 21, 1976
INVENTOR(S) : William H. Dorman It is certified that error appears in the above-identified patent and that said Letters Patent are hereby corrected as shown below:

Column 2, line 66, "end" should read --edge--; Column 3, line 48, "lap" should read --lamp--; Column 3, line 60, "reflections" should read --reflection--; Column 6, line 41, "therafter" should read --thereafter--; Column 6, line 43, "from" should read --form--; Column 6, line 44, "with" should read --which--; Column 6, line 66, before "acute" insert --or--; Column 7, line 14, "lightentrance" should read --light-entrance--; Column 7, line 22, "29b1" should read --29b--; Column 8, line 39, "refractor" should read --reflector--; Column 8, line 63, "glass good" should read --glass having good--; Column 9, line 40, "lightentrance" should read --light-entrance--; Column 9, line 66, "vertial" should read --vertical--; Column 10, line 36, "including" should read --includes--; Column 10, line 43, "suface" should read --surface--; Column 11, line 34, "light face" should read --light exit face--; Column 11, line 48, "lightentrance" should read --light-entrance--; Column 12, lines 10 and 11, "portions" should read --portion--; Column 12, line 43, "from" should read --form--.

Signed and Sealed this

Seventh Day of June 1977

[SEAL]

Attest:

RUTH C. MASON
*Attesting Officer*

C. MARSHALL DANN
*Commissioner of Patents and Trademarks*